July 18, 1939. R. G. AURIEN 2,166,887
BRAKE ARRANGEMENT
Filed Dec. 27, 1937 5 Sheets-Sheet 2

Inventor:
Ray G. Aurien,
By Orin O. B. Garner
Atty.

Inventor:
Ray G. Aurien,
By Orrin B. Garner
atty.

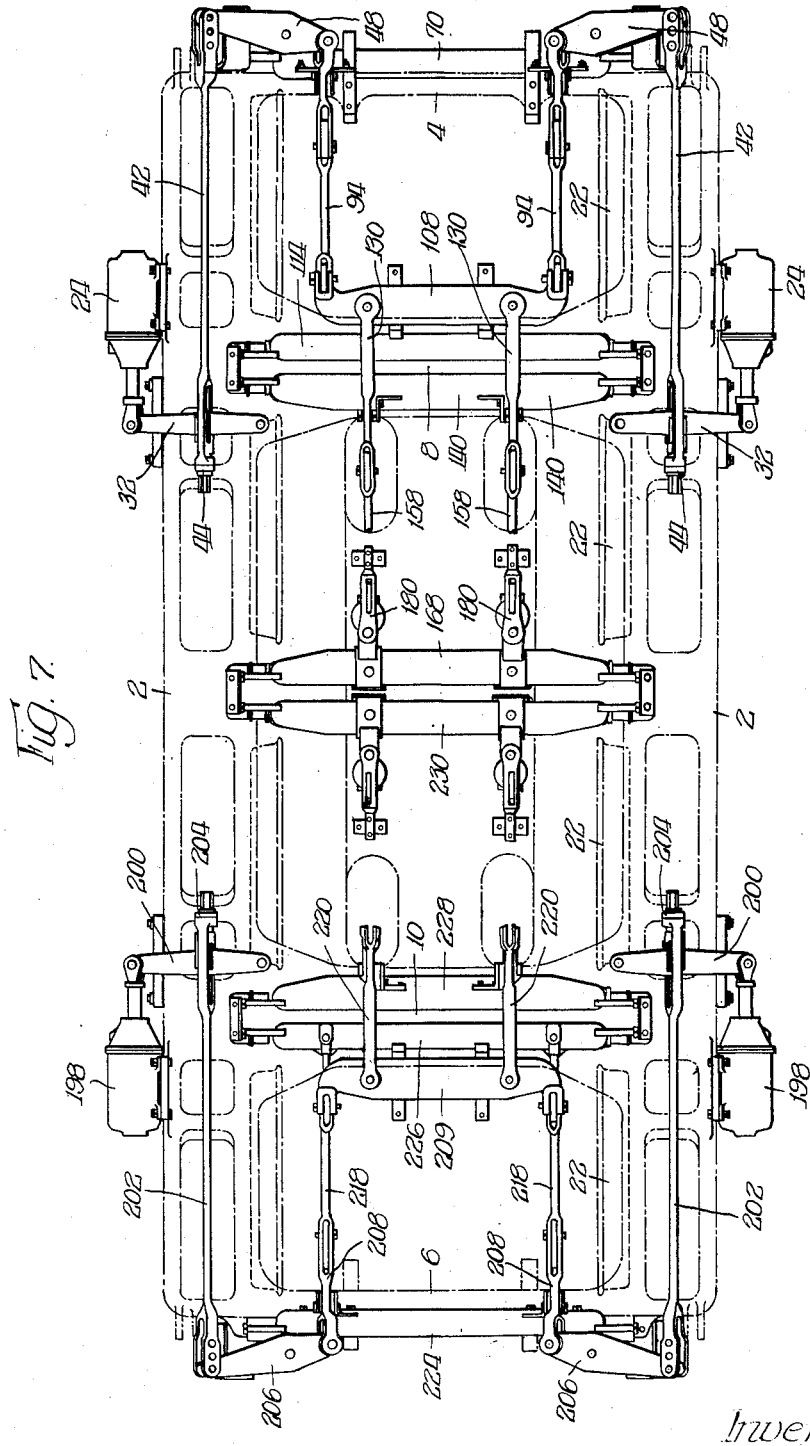

Patented July 18, 1939

2,166,887

UNITED STATES PATENT OFFICE 2,166,887

BRAKE ARRANGEMENT

Ray G. Aurien, Chicago, Ill., assignor to American Steel Foundries, Chicago, Ill., a corporation of New Jersey Application December 27, 1937, Serial No. 181,725

27 Claims. (Cl. 188—56)

My invention relates to railway rolling stock and more particularly to a novel brake arrangement for an eight wheel truck. My novel arrangement of brakes is of the type generally designated unit cylinder clasp brakes wherein the power means is mounted on the truck as distinguished from the car body, and in which brake heads and brake shoes are disposed for engagement with the opposite sides of the periphery of each wheel.

An object of my invention is to design a unit cylinder clasp brake rigging particularly suitable for heavy equipment such as a tender truck wherein is required maximum sturdiness as well as the economy of space.

A further object of my invention is to design a clasp brake rigging of the beam type for an eight wheel tender truck wherein the rigging at each end of the truck will be operated by power means supported on the opposite sides of the truck adjacent the said end.

My invention further contemplates an arrangement of clasp brake rigging for an eight wheel truck wherein the rigging at one end of the truck is operative independently of the rigging at the opposite end of the truck, thus adding a factor to the safety of operation.

A different object of my invention is to design a clasp brake rigging for an eight wheel truck wherein the rigging at opposite ends of the truck is fulcrumed from the bolster adjacent the transverse center line of the truck, thus providing a balanced resultant of forces on said bolster.

Other objects and features incorporated in my invention will be apparent from a consideration of the drawings together with the descriptive material and the appended claims.

In the drawings wherein certain details are omitted from some figures when better shown in others—

Figures 1 and 1A show a top plan view of one half of the truck and brake structure embodying my invention, only one half being shown inasmuch as the opposite sides of the truck are identical in arrangement of parts;

Figures 2 and 2A show a side elevation of the truck and brake structure illustrated in Figures 1 and 1A;

Figure 7 is a top plan view of reduced size, showing the entire truck and brake arrangement.

Figure 1:
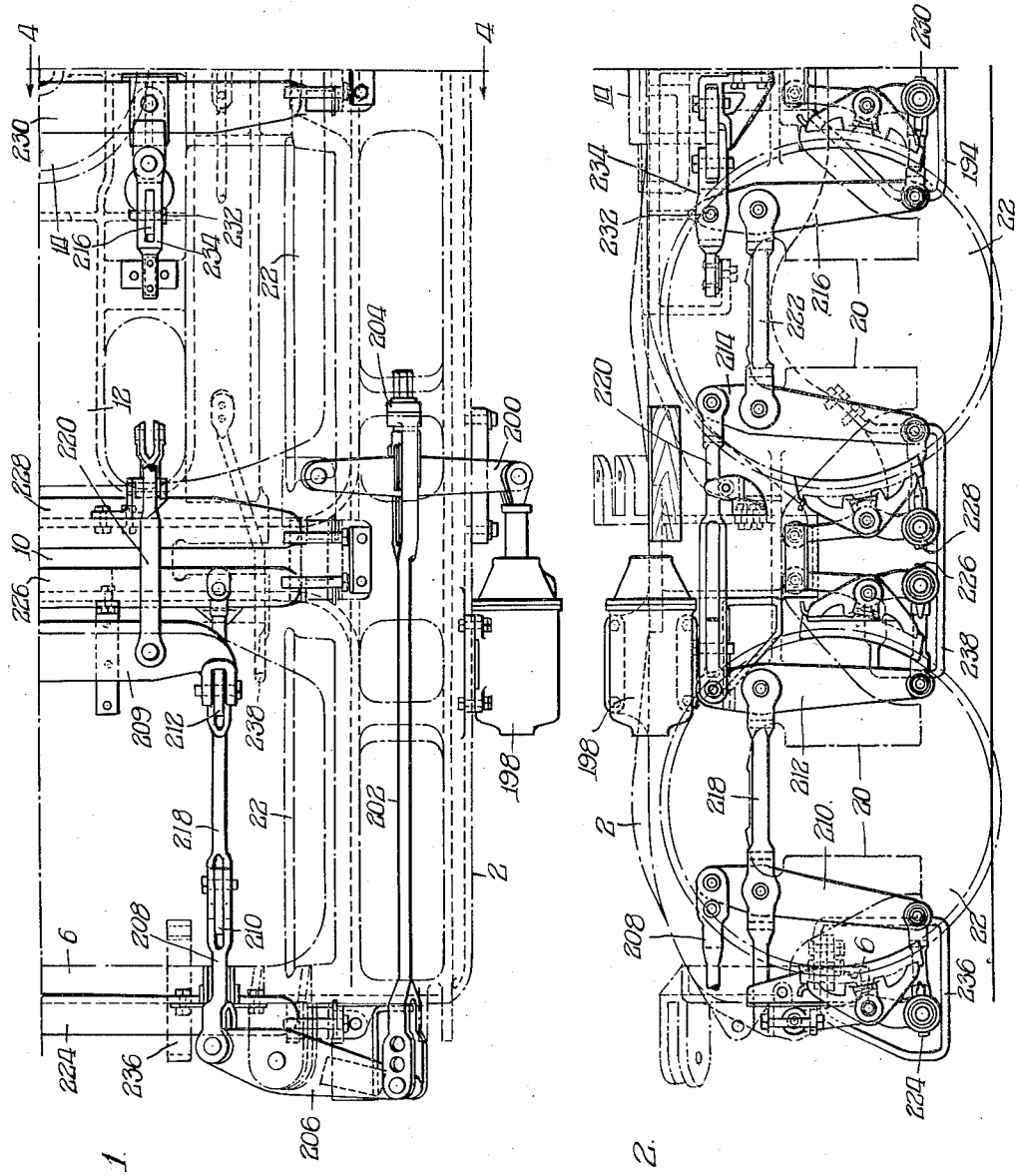

The truck arrangement, which forms no part of my invention, comprises a cast steel frame having the side rail 2, end rails 4 and 6 and the spaced transoms 8 and 10 from which may be supported in the usual manner as by swinging hangers the center span bolster 12 having the center plate 14 upon which may be supported the car body.

The side frame 2 has the inner and outer lateral walls 16 and 18 between which may be arranged an equalizing system comprising coil and elliptic springs and interconnecting equalizing members. The side frames have the pedestal jaws 20, 20 forming a well known method of connection through the journal boxes to the journal ends (not shown) of the wheel and axle assemblies 22, 22. Certain members of the before mentioned equalizing system may be seated upon said journal boxes and provide a means of support for the frame through the side members 2.

The brake rigging comprises the power means or brake cylinder 24 supported from the side frame 2 as at 26, 26, the piston 28 thereof having a pivotal connection as at 30 to the outer end of the dead cylinder lever 32, the inner end of which is fulcrumed as at 34 from the bracket 36 integrally formed with the frame at the juncture of the side frame 2 and the transom 8. The cylinder lever 32 has a support adjacent its outer end in the block 38 secured to the frame. Intermediate its ends as at 40 the cylinder lever 32 has a pivotal connection with the pull rod 42, said connection being made adjustable as by the slack adjuster indicated at 44. The opposite end of the pull rod 42 has an adjustable pivotal connection at 46 with the diagonally arranged auxiliary lever 48 which is fulcrumed intermediate its ends as at 50 from the bracket 52 integrally formed with the frame at the juncture of the side member 2 and the end rail 4. Adjacent its outer end the fulcrum lever 48 has support and guidance from the angular strap 54 supported from the frame as at 56. The inner end of the fulcrum lever 48 has a pivotal connection as at 58 with the pull rod 60 and the inner end of said pull rod has a pivotal and adjustable connection as at 62 to the upper end of the live truck lever 64. The lower end of said live truck lever is pivotally connected as at 66 to the fulcrum 68 on the connector or beam 70. The trunnion end of the connector 70 is pivotally supported as at 72 at the lower end of the hanger lever 74, the upper end of which is hung from the frame as at 76, retaining means for the pivot pin at 76 being provided in the form of a bolt 78. Intermediate the ends of the hanger lever as at 80 is pivotally supported the brake head 82 with the associated brake shoe 84 disposed for engagement with the adjacent wheel. Balancing means of well known type is provided for the brake head at 86. The straps 88 hung from the end rail as at 90, 90 form safety means for the rigging.

Intermediate the ends of the live truck lever 64 as at 92 is pivotally connected the pull rod 94, said pull rod being extended outwardly of the truck as at 96 to have anti-frictional engagement with the roller bracket 98 which is supported from the end rail as at 100, 100. The inner end of the pull rod 94 has a pivotal connection as at 102 intermediate the ends of the live truck lever 104, the upper end of said live truck lever having a pivotal connection as at 106 with the jaw end of the intermediate beam 108 and the lower end of said live truck lever 104 has a pivotal connection as at 110 to the fulcrum 112 mounted on the beam 114 adjacent the end thereof. The trunnion end of the beam 114 has a pivotal connection as at 116 to the lower end of the hanger lever 118 whose upper end is hung from the frame as at 120. Intermediate the ends of the hanger lever 118 is pivotally supported as at 122 the usual brake head and brake shoe.

Figure 6:
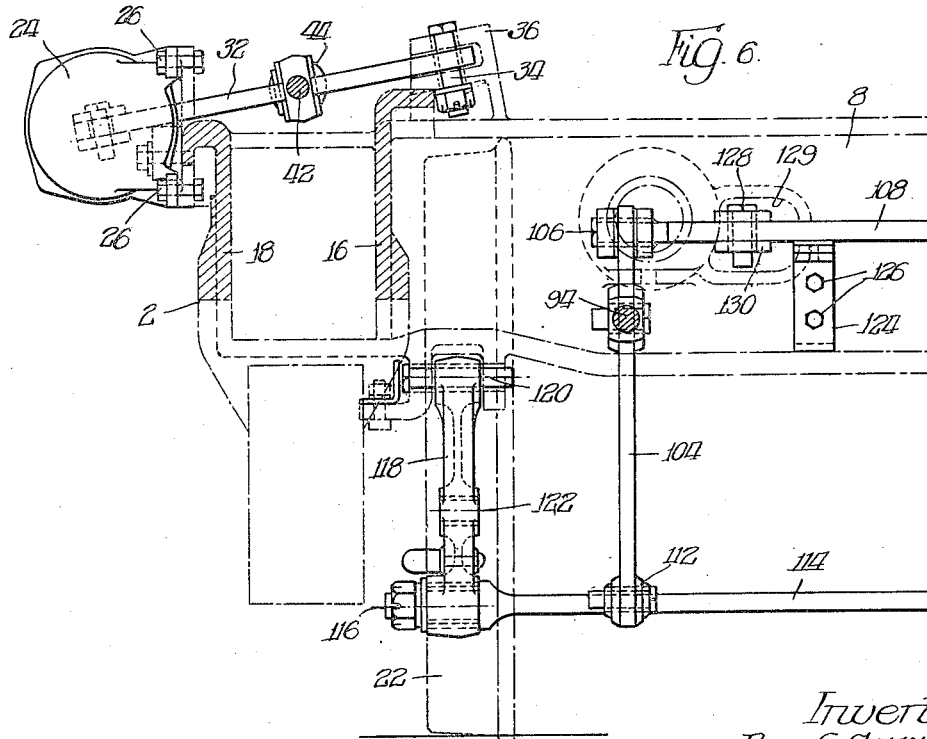
Figure 6 is a still further sectional view through the truck and brake structure, the section being taken in the transverse vertical plane substantially as indicated by the line 6—6 of Figure 1A.

The strap 124 secured to the transom, as at 126 provides support for the intermediate beam adjacent an end thereof. Adjacent the end of the intermediate beam 108 is pivotally connected as at 128 the pull rod 130 which extends through the opening 129 (Figure 6) in the transom 8 and has at its opposite end a pivotal connection as at 132 to the live truck lever 134, the lower end of said live truck lever being pivotally connected as at 136 from the fulcrum 138 secured on the beam 140 adjacent an end thereof. The trunnion end of the beam 140 has a pivotal connection as at 142 to the hanger lever 144, the upper end of which is hung from the frame as at 146, said hanger lever supporting intermediate its ends as at 148 the usual brake head and brake shoe. Safety means for the rigging at this point is provided in the safety hangers 150. Support for the inner end of the pull rod 130 is furnished in the roller bracket 152 secured to the transom 8 as at 154.

Figure 4:
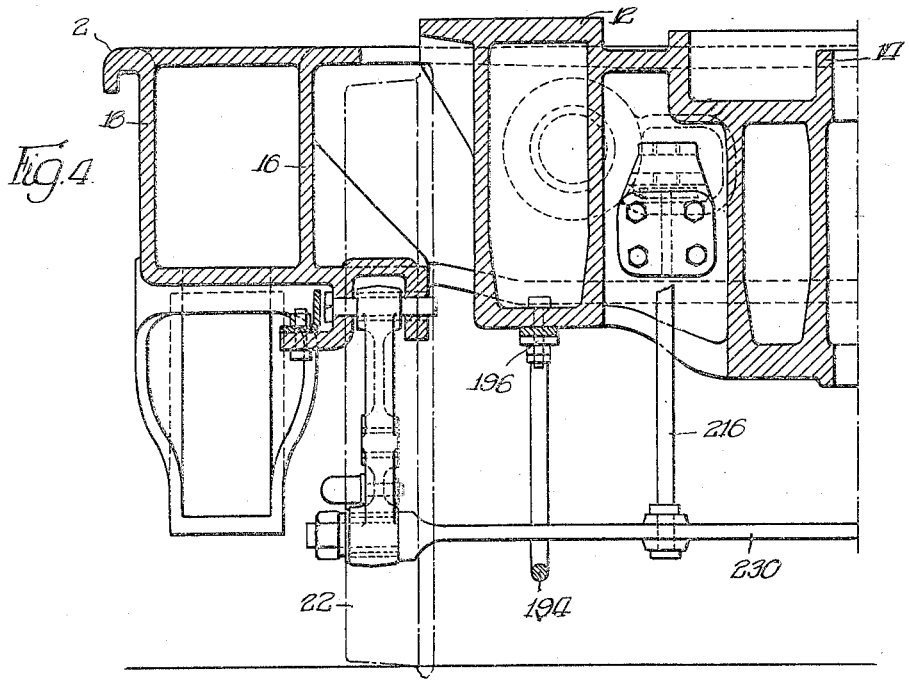
Figure 4 is a transverse sectional view through the truck and brake structure, the section being taken substantially in the vertical plane bisecting the truck transversely and substantially as indicated by the line 4—4 of Figure 1.
Figure 5:
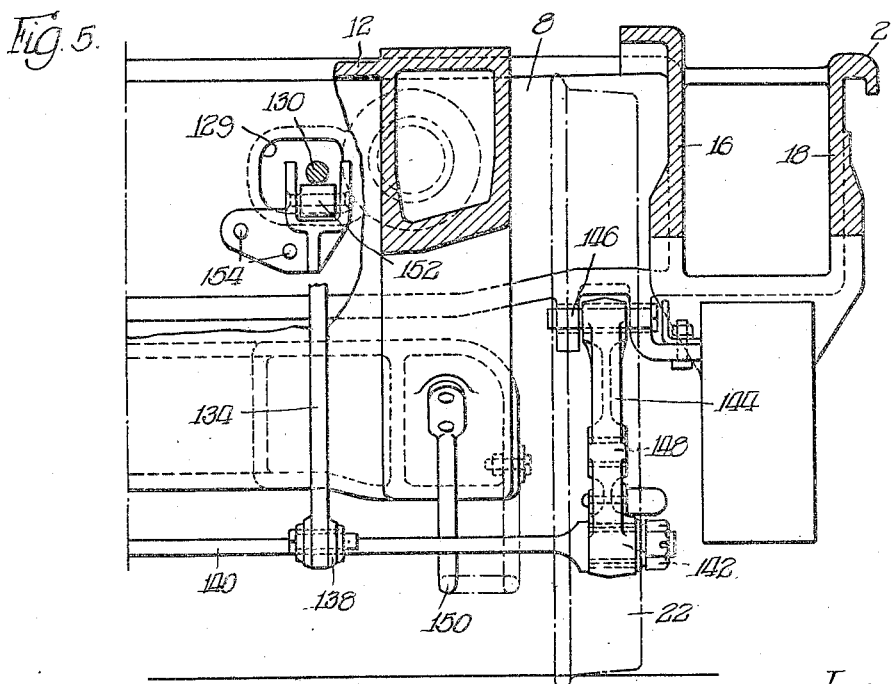
Figure 5 is a sectional view in the transverse vertical plane through the truck and brake structure, the section being taken susbtantially in the plane indicated by the line 5—5 of Figure 1A.

Intermediate the ends of the live truck lever 134 is pivotally connected as at 156 the pull rod 158 whose opposite end has a pivotal connection as at 160 intermediate the ends of the truck lever 162, the lower end of said truck lever having a connection as at 164 to the fulcrum 166 secured on the beam 168 adjacent an end thereof. The trunnion end of the beam has a pivotal connection as at 170 with the lower end of the hanger lever 172 which is supported from the frame as at 174, said hanger lever carrying intermediate its ends as at 176 the usual brake head and brake shoe. The upper end of the live truck lever 162 has a pivotal connection as at 178 with the fulcrum bar 180, one end of said fulcrum bar being slidably supported as at 182 from the shelf 184 and the opposite end or jaw of said fulcrum bar having a pivotal connection as at 186 with the link 188, the opposite end of said link having a pivotal connection as at 190 to the bracket 192 secured on the transverse center wall of the bolster. The safety means for the central portion of the rigging is in the form of the loop 194 extending below the beams and secured to the bolster as at 196 (Figure 4).

The rigging at the opposite end of the truck is similar in arrangement and detail to that just described and comprises the power means 198, the cylinder lever 200, the pull rod 202 with the slack adjuster 204, the diagonally arranged auxiliary fulcrum lever 206, the pull rod 208, the intermediate beam 209, truck levers 210, 212, 214 and 216 with interconnecting pull rods 218, 220 and 222, said truck levers being fulcrumed respectively from the beams or hanger lever connectors 224, 226, 228 and 230, each of said beams being supported at its trunnion end by a hanger lever hung from the frame, said hanger lever supporting intermediate its ends a brake head and brake shoe in the manner previously described. The last mentioned truck lever 216 is fulcrumed from its upper end as at 232 from the fulcrum bar 234, said fulcrum bar being supported similarly to the fulcrum bar 180 on the opposite side of the transverse center line of the truck. The safety strap 236 underlies the end beam 224 and the safety loop 238 encloses the beams 226 and 228.

Figure 2:
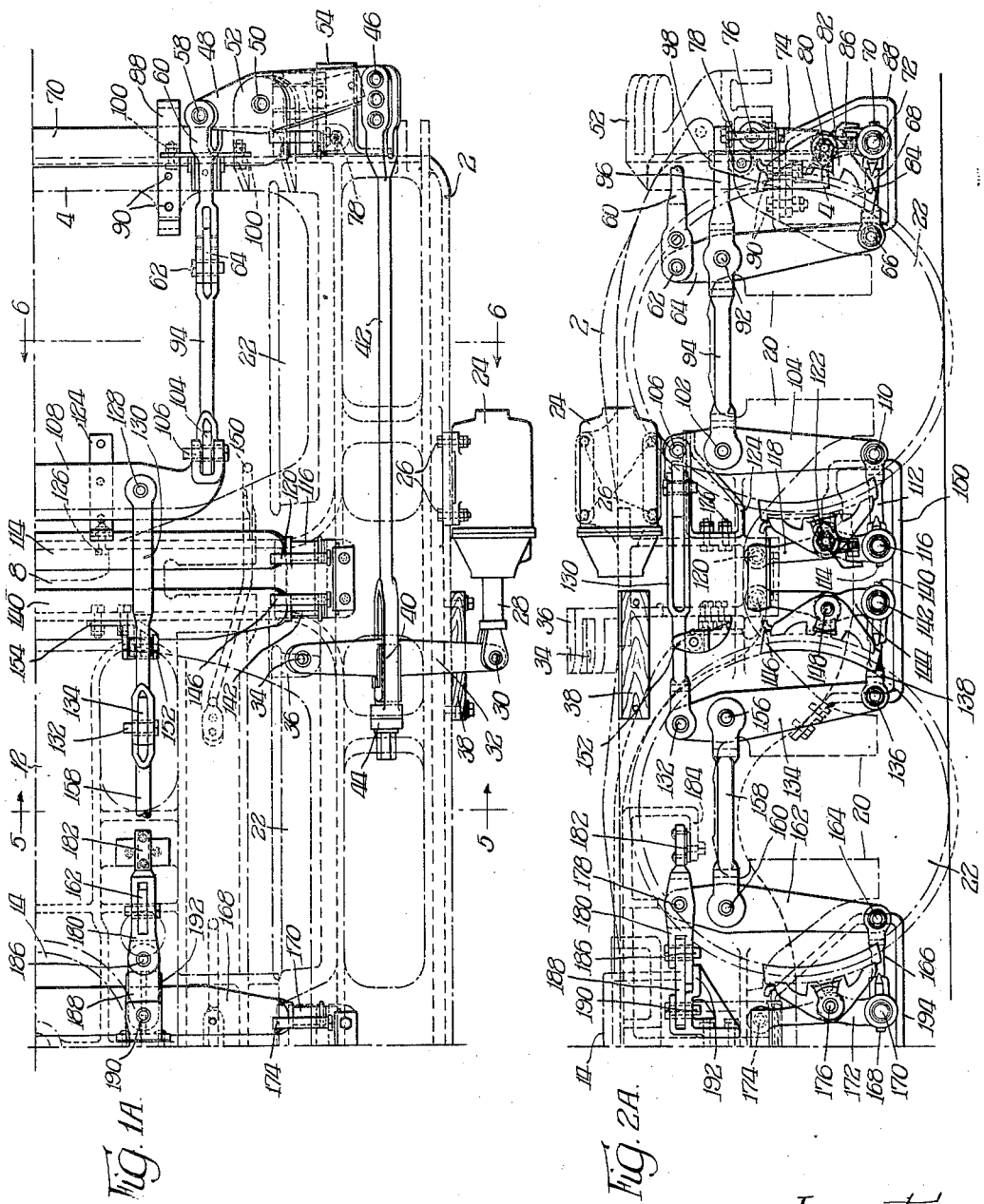
Figure 3:
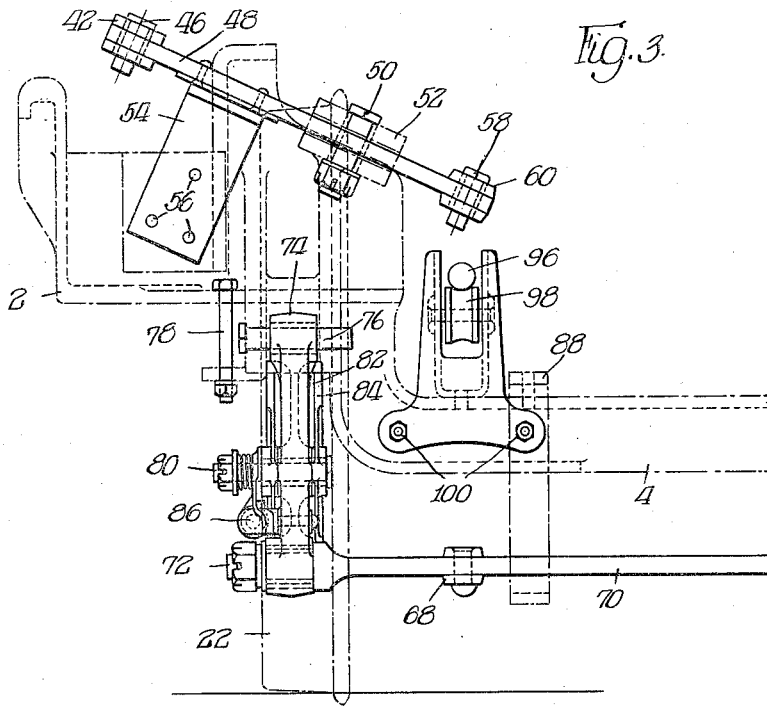
Figure 3 is an end elevation of the truck and brake structure, the view being taken from the right as seen in Figures 1A and 2A.

The operation of the rigging is identical at the opposite ends of the truck and the following description applies to that half of the rigging at the right of the truck as shown in Figures 1A and 2A. It will be readily apparent, however, that disabling of the rigging at one end of the truck would not affect operation of the rigging at the opposite end of the truck inasmuch as they may be used independently.

Assuming the parts to be in released position, actuation of the power means 24 rotates the cylinder lever 32 in a clockwise direction about the fulcrum 34 at its inner end moving the pull rod 42 to the left and rotating the auxiliary lever 48 in a clockwise direction about the fulcrum intermediate its ends and moving the pull rod 60 to the right, said movement being applied in a manner well known to the art through the live truck lever 64, the pull rod 94 and the live truck lever 104 to the intermediate beam 108 and in turn through the pull rod 130, the live truck lever 134 and the pull rod 158 to the dead truck lever 162 which is fulcrumed from the bolster at its upper end. Movement of the said levers is applied to the beams or hanger lever connectors as described, to the hanger levers which support the brake heads and brake shoes at opposite sides of each wheel. Release of the power means causes the parts to move in directions reverse to those just described and permits release of the rigging.

It is to be understood that I do not wish to be limited by the exact embodiment of the invention shown which is merely by way of illustration and not limitation as various and other forms of the device will of course be apparent to those skilled in the art without departing from the spirit of the invention or the scope of the claims.

I claim:

1. In a railway car truck a frame having side members and transverse load carrying members, a bolster supported from said load carrying members, supporting wheel and axle assemblies, and brake rigging comprising hanger levers supporting brake heads and brake beams at opposite sides of each assembly, dead truck levers fulcrumed from said bolster and connected to one of said beams, live truck levers fulcrumed from others of said beams, an intermediate beam connected between the live truck levers associated with one of said beams, pull rods connecting points adjacent the opposite ends of said intermediate beam to the live truck levers associated with another of said beams, pull rods interconnecting the truck levers adjacent each wheel, and means for operating said rigging comprising power means on opposite sides of said frame, auxiliary levers fulcrumed adjacent the opposite corners of said frame at one end thereof and operatively connected respectively to said power means, and operative connections between said auxiliary levers respectively and the adjacent live truck levers.

2. In a railway car truck a frame, a bolster, a brake cylinder and a fulcrum lever connected to each other and mounted on said frame adjacent each corner thereof, end and intermediate wheel and axle assemblies, brake beams supported at opposite sides of each wheel and axle assembly, live and dead truck levers fulcrumed from the beams of the intermediate assemblies, live truck levers fulcrumed from the beams of the end assemblies, connections between adjacent truck levers, said dead truck levers having their upper ends fulcrumed from said bolster and said live truck levers adjacent the ends of said truck being operatively connected respectively to said fulcrum levers, the connection between said truck levers associated with adjacent assemblies comprising an intermediate beam having its ends connected to the live truck levers associated with one of said assemblies, and points adjacent its ends connected to the live truck levers associated with the other assembly.

3. In a railway car truck a frame, a bolster, a brake cylinder and a fulcrum lever connected to each other and mounted on said frame adjacent each corner thereof, end and intermediate wheel and axle assemblies, brake beams supported at opposite sides of each wheel and axle assembly, live and dead truck levers fulcrumed from the beams of the intermediate assemblies, live truck levers fulcrumed from the beams of the end assemblies, connections between adjacent truck levers, said dead truck levers having their upper ends fulcrumed from said bolster and said live truck levers adjacent the ends of said truck being operatively connected respectively to said fulcrum levers, the connection between truck levers associated with adjacent assemblies comprising an intermediate beam connected between the upper ends of live truck levers associated with an end assembly, and pull rods connecting the upper ends of live truck levers associated with an adjacent assembly to points adjacent the opposite ends of said intermediate beam.

4. In a railway car truck a frame having spaced transoms, a bolster, end and intermediate wheel and axle assemblies, power means mounted on opposite sides of said frame adjacent one end thereof, dead auxiliary levers fulcrumed from opposite corners of said frame at said end, connections between said dead levers and said power means respectively, and brake rigging for an end and intermediate assembly comprising hanger levers supporting brake heads and brake beams at opposite sides of each assembly, live truck levers fulcrumed from the beams of the end assembly, live and dead truck levers fulcrumed from the beams of the intermediate assembly, connections between said truck levers, said dead truck levers having their upper ends fulcrumed from means on said bolster, and operative connections between certain of said live truck levers at opposite sides of the truck and the adjacent auxiliary levers.

5. In a railway car truck a frame having spaced transoms, a bolster, end and intermediate wheel and axle assemblies, power means mounted on opposite sides of said frame adjacent one end thereof, dead auxiliary levers fulcrumed from opposite corners of said frame at said end, connections between said dead levers and said power means respectively, and brake rigging associated with an end and an intermediate assembly comprising hanger levers supporting brake heads and brake beams at opposite sides of each assembly, fulcrum bars supported from said bolster, live truck levers fulcrumed from the beams associated with one of said assemblies, live and dead truck levers fulcrumed from the beams associated with the other of said assemblies, and connections between adjacent truck levers, said dead truck levers being connected to said fulcrum bars and certain of said live truck levers being operatively connected to said auxiliary levers respectively.

6. In an eight wheel railway car truck a frame having side members, end rails and spaced transoms, a bolster supported from said transoms, wheel and axle assemblies, power means on each of said side members, auxiliary levers fulcrumed from said frame adjacent corresponding ends of said side members, and brake rigging comprising hanger levers supporting brake heads and brake beams on opposite sides of each assembly, interconnected truck levers fulcrumed from the beams associated with each of said assemblies, and operative connections between truck levers associated with adjacent wheels, the truck levers at one end of said rigging being fulcrumed from said bolster and the truck levers at the opposite end of said brake rigging being operatively connected respectively to said auxiliary levers.

7. In a railway car truck a frame, a bolster, end and intermediate wheel and axle assemblies, power means mounted on opposite sides of said frame adjacent one end thereof, dead auxiliary levers fulcrumed from opposite corners of said frame at said end, connections between said dead levers and said power means respectively, and brake rigging for one end of said truck comprising brake beams supported at opposite sides of each assembly, dead truck levers fulcrumed at their upper ends from said bolster and connected at their lower ends to the beam inwardly of said intermediate assembly, live truck levers having their lower ends connected to the beam outwardly of said intermediate assembly and to the beams on the opposite sides of said end assembly, connections between said truck levers, and operative connections between said auxiliary levers at opposite sides of the truck and certain of said live truck levers.

8. In a railway car truck a frame having spaced transoms, a bolster hung from said transoms, spaced end and intermediate wheel and axle assemblies, power means mounted on said frame adjacent the four corners thereof, auxiliary levers fulcrumed on said frame adjacent each of said corners and operatively connected to said power means respectively, and brake rigging comprising brake beams supported at opposite sides of each assembly, live truck levers fulcrumed from the beams for the end assemblies, live and dead truck levers fulcrumed from the beams for the intermediate assemblies, connections between adjacent truck levers, said dead truck levers being fulcrumed from said bolster, and operative connections between the live truck levers at opposite ends of the truck and the adjacent auxiliary levers.

9. In a railway car truck a frame, a bolster, a brake cylinder and a fulcrum lever connected to each other and mounted on said frame adjacent each corner thereof, end and intermediate wheel and axle assemblies, brake beams supported at opposite sides of each wheel and axle assembly, live and dead truck levers fulcrumed from the beams of the intermediate assemblies, live truck levers fulcrumed from the beams of the end assemblies, and connections between adjacent truck levers, said dead truck levers having their upper ends fulcrumed from said bolster and said live truck levers adjacent the ends of said truck being operatively connected respectively to said fulcrum levers.

10. In a railway car truck a frame having spaced transoms, a bolster, a brake cylinder and a fulcrum lever connected to each other and mounted on said frame adjacent each corner thereof, end and intermediate wheel and axle assemblies, brake beams supported at opposite sides of each wheel and axle assembly, live and dead truck levers fulcrumed from the beams of the intermediate assemblies, live truck levers fulcrumed from the beams of the end assemblies, and connections between adjacent truck levers, said dead truck levers having their upper ends fulcrumed from said bolster and said live truck levers adjacent the ends of said truck being operatively connected respectively to said fulcrum levers, the connections between certain of said truck levers associated with adjacent assemblies comprising an intermediate beam.

11. In a railway car truck a frame having spaced transoms, a bolster, end and intermediate wheel and axle assemblies, power means mounted on opposite sides of said frame adjacent one end thereof, dead auxiliary levers fulcrumed from opposite corners of said frame at said end, connections between said dead levers and said power means respectively, brake rigging associated with an end and an intermediate assembly comprising live truck levers associated with the end assembly, live and dead truck levers associated with the intermediate assembly, connections between said truck levers, and operative connections between said dead auxiliary levers and the adjacent live truck levers at opposite sides of the truck.

12. In a railway car truck a frame having spaced transoms, a bolster, end and intermediate wheel and axle assemblies, power means mounted on opposite sides of said frame adjacent one end thereof, dead auxiliary levers fulcrumed from opposite corners of said frame at said end, connections between said dead levers and said power means respectively, and brake rigging associated with an end and an intermediate assembly, said rigging comprising brake beams supported on opposite sides of each assembly, live truck levers fulcrumed from the beams of the end assembly, live and dead truck levers fulcrumed from the beams of the intermediate assembly, connections between said truck levers, and operative connections between said auxiliary levers at opposite sides of the truck and the adjacent live truck levers.

13. In an eight wheel railway car truck a frame, a bolster, wheel and axle assemblies, operatively connected power means and fulcrum levers mounted adjacent each corner of said truck, fulcrum bars on said bolster adjacent the transverse center line of said truck, live and dead truck levers supported on opposite sides of the intermediate assemblies adjacent each wheel thereof, said dead truck levers being fulcrumed from said bars, live truck levers supported on opposite sides of the end assemblies adjacent each wheel thereof, and connections between adjacent truck levers, said truck levers at the opposite ends of the truck being operatively connected respectively to the adjacent auxiliary levers.

14. In an eight wheel railway car truck a frame having spaced transoms, a bolster supported therebetween, end and intermediate wheel and axle assemblies, power means mounted adjacent each corner of said frame, a plurality of dead levers fulcrumed from said frame for each of said power means and operatively connected thereto, and operative connections between certain of said dead levers at each end of the truck and braking means associated with an end and an intermediate assembly, said braking means comprising live and dead truck levers supported at opposite sides of the intermediate assembly, said dead truck levers being fulcrumed from said bolster, live truck levers supported on opposite sides of the end assembly, and connections between said truck levers.

15. In a railway car truck a frame, a bolster supported thereon, end and intermediate wheel and axle assemblies, power means mounted adjacent each corner of said frame, a plurality of dead levers fulcrumed from said frame for each of said power means and operatively connected thereto, and operative connections between certain of said dead levers at each end of the truck and braking means associated with an end and an intermediate assembly, said braking means comprising fulcrum bars supported from said bolster, dead truck levers fulcrumed from said bars on one side of the intermediate assembly, live truck levers supported at the opposite side of said intermediate assembly and on opposite sides of the end assembly, and connections between said truck levers.

16. In an eight wheel railway car truck a frame having spaced transoms, a bolster supported therebetween, spaced wheel and axle assemblies, power means mounted on said frame adjacent each corner, a plurality of levers fulcrumed from the frame for each power means and operatively connected thereto, and operative connections between certain of said fulcrumed levers at one end of said truck, and braking means associated with an end and an intermediate assembly, said braking means comprising dead truck levers connected to means on said bolster inwardly of said intermediate assembly, live truck levers outwardly of said intermediate assembly and on opposite sides of said end assembly, and operative connections between said truck levers, said connections between said truck levers comprising an intermediate beam.

17. In a railway car truck a frame, a bolster supported thereon, end and intermediate wheel and axle assemblies, power means mounted adjacent each corner of said frame, a plurality of dead levers fulcrumed from said frame for each of said power means and operatively connected thereto, and operative connections between certain of said dead levers at each end of the truck and braking means associated with an end and an intermediate assembly.

18. In a railway car truck, a framework comprising a transverse load carrying member, end and intermediate wheel and axle assemblies, interconnected fulcrum levers and power means mounted adjacent the corners at one end of said framework, brake rigging associated with an end and an intermediate assembly and comprising truck levers on opposite sides of each assembly adjacent each wheel thereof and connections between said truck levers, certain of said truck levers being fulcrumed from means on said load carrying member and certain of said truck levers being operatively connected to said fulcrum levers.

19. In a railway car truck, a framework including a transverse load carrying member, end and intermediate wheel and axle assemblies, power means mounted adjacent each corner of said framework, a plurality of dead levers fulcrumed from said framework for each of said power means and operatively connected thereto, and operative connections between certain of said dead levers at each end of the truck and braking means associated with an end and an intermediate assembly, said braking means comprising fulcrum connections with said transverse load carrying member adjacent the transverse center line of said truck.

20. In a car truck, a framework comprising a transverse load carrying member, end and intermediate wheel and axle assemblies, power means mounted on said framework adjacent each corner, a plurality of levers fulcrumed from the frame for each power means and operatively connected thereto, operative connections between certain of said fulcrum levers at one end of said truck and braking means associated with an end and intermediate assembly, said braking means comprising fulcrum connections with said load carrying member adjacent the transverse center line of said truck.

21. In a car truck, a framework including a transverse load carrying member, end and intermediate wheel and axle assemblies, power means on the framework adjacent each corner, a fulcrum lever operatively connected to each power means, and operative connections between the fulcrum levers at each end of said truck and braking means associated with an end and intermediate assembly, said braking means comprising a fulcrum connection to said load carrying member adjacent the transverse center line of said truck.

22. In a railway car truck, a framework comprising a transverse load carrying member, end and intermediate wheel and axle assemblies, power means on one end of said framework adjacent opposite corners, a fulcrum lever operatively connected to each power means, braking means associated with an end and intermediate assembly and comprising brake means on opposite sides of each of said assemblies, and an intermediate beam associated with one of said assemblies, and operative connections between the before-mentioned fulcrum levers at each side of the truck and said braking means.

23. In a railway car truck, a framework comprising a transverse load carrying member, fulcrum means on said framework adjacent the transverse center line thereof, end and intermediate wheel and axle assemblies, power means on one end of said framework adjacent opposite corners thereof, a fulcrum lever operatively connected to each power means, braking means associated with an end and intermediate assembly and comprising connection to said fulcrum means adjacent the transverse center line of said truck and operative connections between the fulcrum levers at each side of the truck and said braking means.

24. In a railway car truck, a framework including a transverse load carrying member, end and intermediate wheel and axle assemblies, power means on the framework adjacent each corner, a fulcrum lever operatively connected to each power means, braking means associated with said assemblies and comprising brake beams on each side of each assembly, an intermediate beam associated with an intermediate assembly and operative connections between said fulcrum levers at each end of the truck and the braking means associated with an end and an intermediate assembly.

25. In a railway truck a frame, a bolster, end and intermediate wheel and axle assemblies, interconnected fulcrum levers and power means mounted adjacent the corners at one end of said frame, and brake rigging associated with an end and an intermediate assembly and comprising truck levers on opposite sides of each assembly adjacent each wheel thereof, and connections between said truck levers, certain of said truck levers being fulcrumed from means on said bolster and certain of said truck levers being operatively connected to said fulcrum levers.

26. In a car truck a frame, a bolster supported therefrom, end and intermediate wheel and axle assemblies, power means mounted on said frame adjacent each corner, a plurality of levers fulcrumed from the frame for each power means and operatively connected thereto, and operative connections between certain of said fulcrumed levers at one end of said truck and braking means associated with an end and an intermediate assembly.

27. In a car truck a frame, a bolster supported therefrom, end and intermediate wheel and axle assemblies, power means on said frame adjacent each corner, a fulcrum lever operatively connected to each power means, and operative connections between the fulcrumed levers at each end of said truck and braking means associated with an end and an intermediate assembly.

RAY G. AURIEN.